Aug. 13, 1968 C. B. NEAL ET AL 3,397,340

VERTICAL CONVERGENCE TILT CIRCUITRY

Filed May 10, 1966 3 Sheets-Sheet 1

INVENTORS
CHARLES B. NEAL
LAWRENCE R. POEL

BY

Robert E. Strauser
ATTORNEY

INVENTORS
CHARLES B. NEAL
LAWRENCE R. POEL
BY
Robert E. Strausser
ATTORNEY

INVENTORS
CHARLES B. NEAL
LAWRENCE R. POEL

BY Robert E. Strauss

ATTORNEY

United States Patent Office 3,397,340

Patented Aug. 13, 1968

3,397,340

VERTICAL CONVERGENCE TILT CIRCUITRY

Charles B. Neal and Lawrence R. Poel, Batavia, N.Y., assignors to Sylvania Electric Products Inc., a corporation of Delaware Filed May 10, 1966, Ser. No. 548,950

5 Claims. (Cl. 315—13)

ABSTRACT OF THE DISCLOSURE

A multi-gun color television convergence circuit comprising a source of a first and second output potential containing both a sawtooth and a pulse portion; a voltage dependent resistor which eliminates the sawtooth portion of the second output potential; and an adder for adding the remaining pulse portion of the second output potential with the first output potential in order to produce a combined sawtooth potential. The combined sawtooth potential and the first output potential are both applied to each vertical convergence winding of the receiver in order to produce vertical convergence.

This invention relates to color television receivers and more particularly to electrical circuitry for shaping the potentials applied to convergence apparatus associated with a multi-gun cathode ray tube utilized in a color television receiver.

A major portion of presently available color television receivers employ a cathode ray tube of the shadow-mask type which includes the usual red, green, and blue electron guns providing three electron beams which traverse the longitudinal axis of the cathode ray tube. These electron beams are deflected in both horizontal and vertical directions by apparatus associated with the cathode ray tube in a manner well known in the art. Electromagnets, one for each electron beam, having horizontal and vertical windings are associated with the cathode ray tube to provide the desired convergence of the electron beams at all points.

The prior art suggests circuit means for providing a substantially sawtooth-shaped waveform of potential occurring at the horizontal deflection frequency and the application of this potential to the horizontal winding of the electromagnets. Therein, the sawtooth-shaped waveform of potential causes development of a current flow having a substantially parabolic-shaped waveform. Also, circuitry is provided for development of a substantially pulse-shaped waveform of potential which is applied to the horizontal winding of the electrimagnets to cause development of a current flow therein having a substantially sawtooth-shaped waveform. Thus, the substantially sawtooth-shaped current waveform and parabolic-shaped current waveform are combined in a manner and amount such that the sawtooth-shaped current waveform shapes and tilts the parabolic-shaped waveform to cause the desired convergence of the electron beams along the horizontal axis of the cathode ray tube.

In a general manner, the prior art also suggests circuitry means for providing potentials applicable to the vertical winding of the electromagnets to cause development of current flow therethrough in an amount and of a waveform such that convergence of the electron beams is attained along the vertical axis of the cathode ray tube. Moreover, such circuitry is intended to provide the substantially sawtooth-shaped and parabolic-shaped waveforms of current referred to with respect to the horizontal convergence apparatus.

However, it is known that most of the circuitry presently available for providing energizing potentials for application to the vertical winding of the electromagnets to cause vertical convergence of the electron beams leaves much to be desired. More specifically, the potentials available for effecting vertical convergence in presently available color television receivers are far from ideal with respect to waveform shape. Thus, the resultant waveform of current flowing through the vertical winding of the electromagnets leaves much to be desired. Moreover, it has been found that the utilization of variable controls having an unusually wide operational range in an effort to compensate for the undesired waveform of potential applied to the vertical convergence winding does not, in many cases, permit adequate vertical convergence of the electron beams.

Therefore, it is an object of this invention to enhance the vertical convergence capabilities of a color television receiver.

Another object of the invention is to improve the waveform shaping of potentials applied to the vertical winding of electromagnets associated with a multi-gun cathode ray tube to effect vertical convergence of the electron beams therein.

Still another object of the invention is to provide improved circuitry means for shaping the potentials for effecting vertical convergence in a multi-gun cathode ray tube utilized in a color television receiver.

A further object of the invention is to provide means for discriminating against selected portions of potential waveforms to cause improved vertical convergence of electron beams in a multi-gun cathode ray tube.

These and other objects are achieved in one aspect of the invention by circuit means wherein is provided a potential source having first and second output potentials in phase opposition and at vertical deflection frequency and means for selecting a portion of the second output potential and combining this selected portion with the first output potential to provide a combined potential which is applied to the vertical winding of the convergence electromagnets.

For a better understanding of the present invention, together with other and further objects, advantages and capabilities thereof, reference is made to the following disclosure and appended claims in connection with the accompanying drawings in which:

Figure 4:
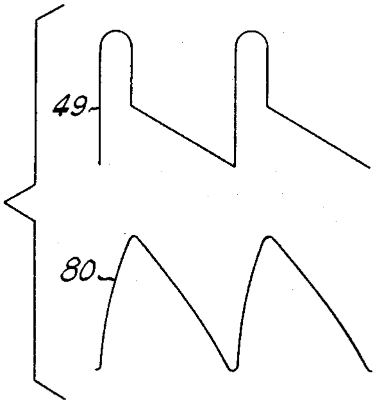
Figure 5:
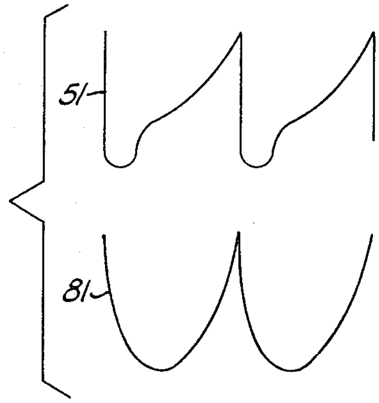
Figure 6:
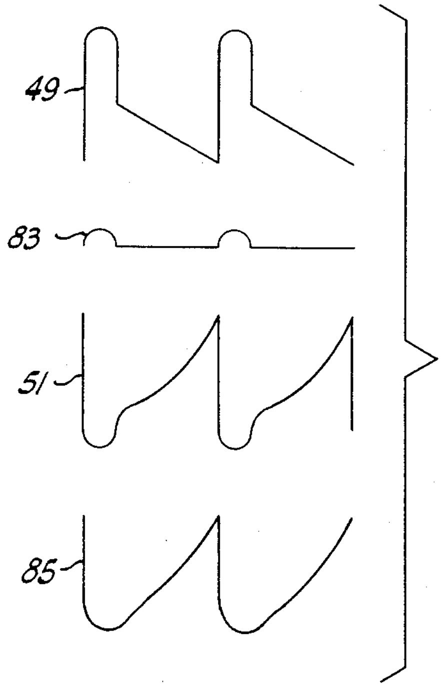

FIGS. 4, 5, and 6 illustrate waveforms for the explanation of the present invention.

Figure 1:
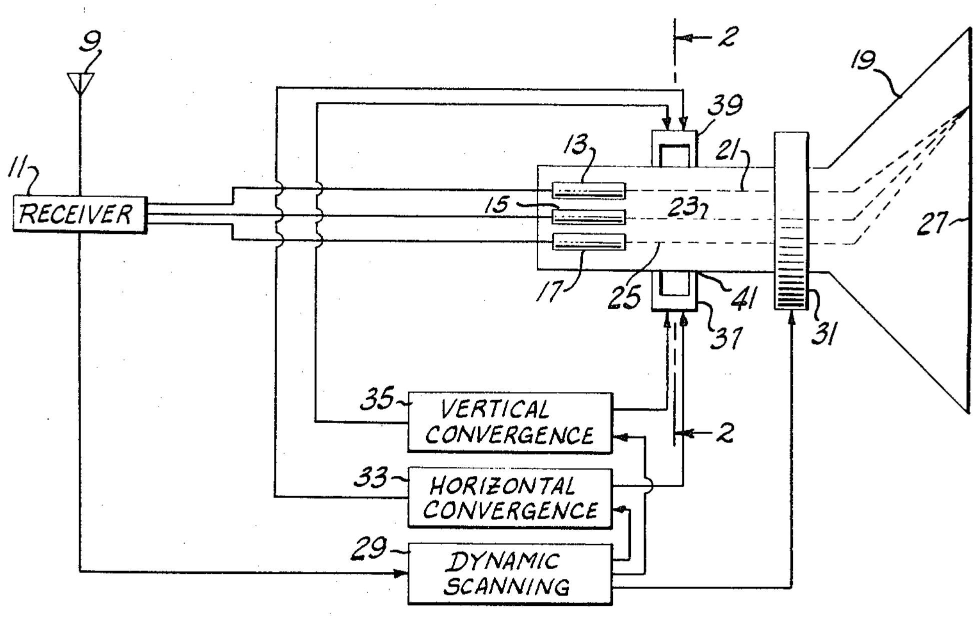
FIG. 1 is a diagrammatic representation of a color television receiver employing a multi-gun cathode ray tube.

Referring to the drawings, FIG. 1 illustrates an antenna 9 for intercepting television signals which are coupled to a color television receiver 11. The receiver 11 is coupled to the electron guns 13, 15, and 17 of a multi-gun color cathode ray tube 19. Each of the electron guns 13, 15, and 17 produces an electron beam 21, 23, and 25 respectively which transverses a path along the longitudinal axis of the cathode ray tube 19 to a display screen 27 having a plurality of phosphor triads thereon. Also, each of the electron beams 21, 23, and 25 is modulated in accordance with the color information contained in the received signal and upon impinging the phosphor triads on the screen 27 provide a color display representative of received color information.

Dynamic scanning circuitry 29 couples horizontal and vertical frequency potentials available in the receiver 11 to a deflection yoke 31 associated with the cathode ray tube 19. This scanning circuitry 29 serves to provide potentials at both horizontal and vertical frequencies which, in conjunction with the deflection yoke 31, cause the electron beams 21, 23, and 25 to traverse the screen 27 in both horizontal and vertical directions.

Also, a horizontal convergence circuit 33 and a vertical convergence circuit 35 are coupled to the dynamic scanning circuitry 29 and provide output potentials which are coupled to the three convergence electromagnets 37, 39, and 41. As is well known, the objective of the output potentials from the horizontal and vertical convergence circuitry 33 and 35 in conjunction with the electromagnets 37, 39, and 41 is to provide magnetic fields which serve to effectuate convergence of the electron beams 21, 23, and 25 at a common point throughout horizontal and vertical scanning of the screen 27.

Figure 2:
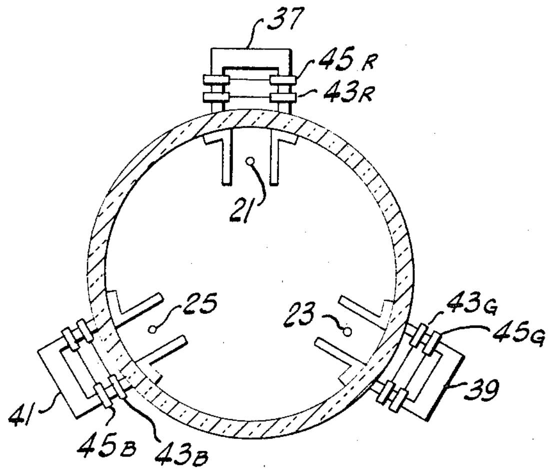
FIG. 2 is a sectional view of FIG. 1 taken along the line 2—2.

As to the electromagnets 37, 39, and 41 each includes a substantially U-shaped magnet having a pair of legs (FIG. 2). A horizontal convergence winding 43R, 43G, and 43B is affixed to each of the legs immediately adjacent the cathode ray tube 19 and a vertical convergence winding 45R, 45G and 45B is located on each of the legs near the bight of the U-shaped magnet. Also, the electromagnets 37, 39, and 41 are spaced about the neck portion of the cathode ray tube 19 such that each of the electromagnets 37, 39, and 41 is in the vicinity of and has a greater effect on one of the electron beams 21, 23, and 25 respectively.

It has previously been mentioned that known circuitry for effecting convergence of the electron beams along the horizontal axis of the cathode ray tube does not, at present, appear to present a problem while available circuitry for effecting vertical convergence of the electron beams leaves much to be desired. Moreover, it has been found that the inadequacy of the vertical convergence capabilities is directly related to the departure in the waveform of the potentials applied to the vertical winding of the electromagnets from the desired potential waveform.

Figure 3:
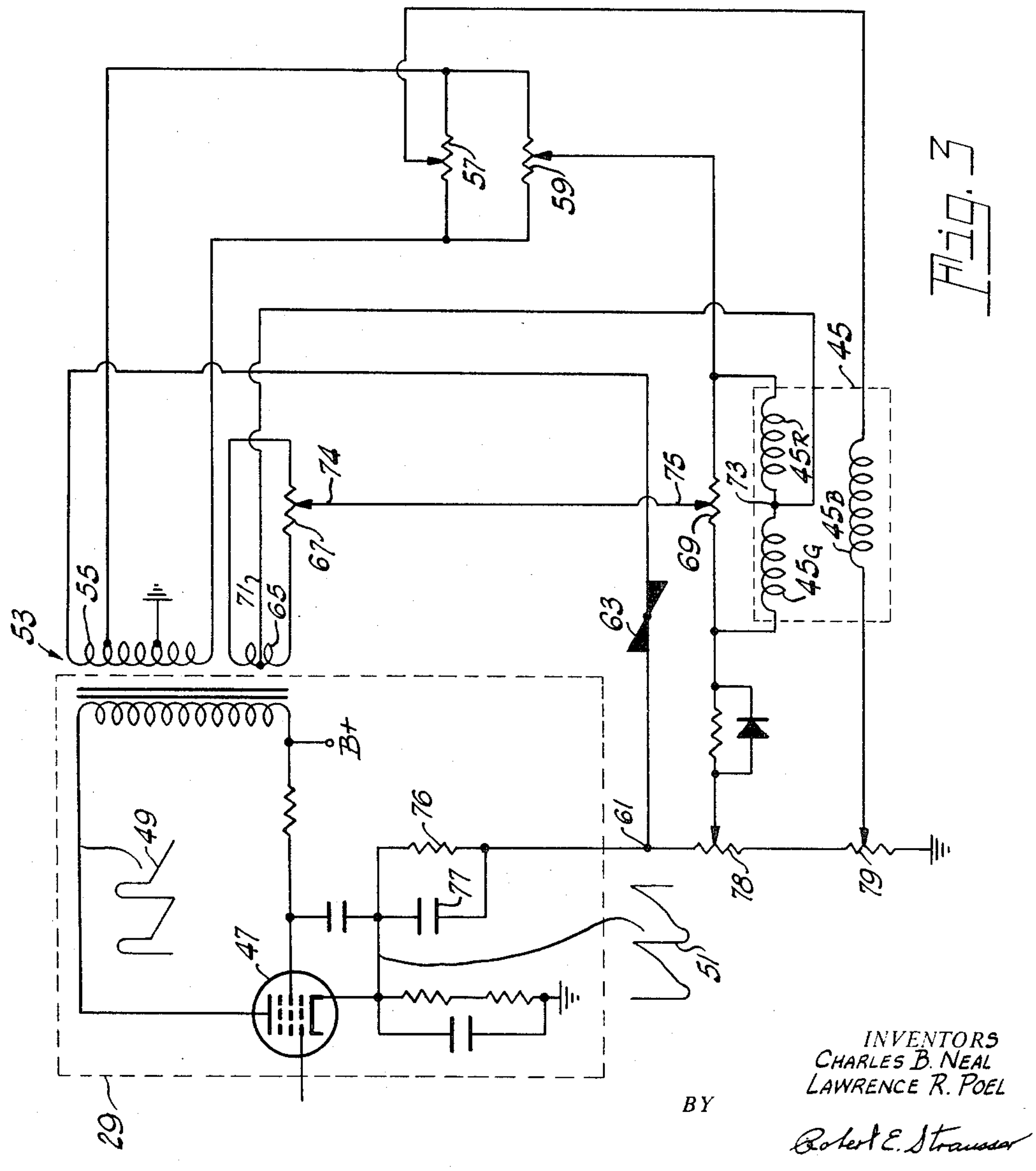
FIG. 3 is a schematic diagram illustrating convergence circuitry for energizing the vertical winding of the electromagnets of FIG. 2.

Referring to FIG. 3, there is illustrated, in schematic form, a preferred embodiment of the vertical convergence circuitry 35 in conjunction with the vertical convergence winding 45R, 45G, and 45B of the electromagnets 37, 39, and 41. The vertical output tube 47 in the dynamic scanning circuitry 29 provides a first output potential at the anode thereof having a waveform 49 occurring at the vertical deflection frequency and including a substantially sawtooth-shaped portion and a substantially pulse-shaped portion. A second output potential having a somewhat similar waveform 51 including a substantially sawtooth-shaped portion and a substantially pulse-shaped portion but in phase opposition to the first output potential, waveform 49, is provided at the cathode of the vertical output tube 47.

The first output potential, waveform 49 is applied to the vertical convergence winding 45B by way of a transformer 53 having a secondary winding 55 partially shunted by a first alterable resistor 57 and to the differentially connected vertical convergence windings 45R, and 45G via a second alterable resistor 59 shunting the first resistor 57. Also a portion of the first output potential, waveform 49 is coupled to a junction 61 via the secondary winding 55 of the transformer 53 and a potential waveform selecting means 63 which will be explained hereinafter.

Also, the first output potential, waveform 49 is applied to the differentially connected vertical convergence windings 45R and 45G via a secondary winding 65 of the transformer 53, an alterable resistor 67 (vert. differential *R/G* tilt control), and an alterable resistor 69 (vertical differential *R/G* amplitude control). The secondary winding 65 has center tap 71 connected to a junction 73 of the convergence windings 45R and 45G. The resistor 67 shunts the winding 65 and has an adjustable arm 74 connected to the adjustable arm 75 of alterable resistor 69 shunting the vertical convergence windings 45R and 45G.

Further, the second output potential, waveform 51, available at the cathode of the vertical output tube 47 is coupled via a parallel connected resistor 76 and capacitor 77 to the junction 61. The junction 61 is coupled to circuit ground by way of series connected alterable resistors 78 and 79. The alterable resistor 78 is coupled to the vertical convergence winding 45G and 45R shunted by alterable resistor 69 while the alterable resistor 79 is coupled to the vertical convergence winding 45B.

Prior to a description of the operational details of the circuit embodiment illustrated in FIG. 3, a brief review of general convergence circuitry operation would perhaps be in order. Assuming for a moment that the first and second output potentials, having waveforms 49 and 51 were applied to a convergence winding. As illustrated in FIG. 4, integration of the first output potential, waveform 49, would provide a current flow having a waveform 80 with a substantially sawtooth-shaped portion and a substantially parabolic-shaped portion. Also, FIG. 5 illustrates integration of the second output potential, waveform 51, to provide a waveform 81, of current having a parabolic-shape which is undesirably tilted due to the presence of the pulse portion of the waveform 51.

Although it is known that the substantially sawtooth-shaped portion of current flow, waveform 80, may be utilized to correct the undesired tilt of the parabolic-shaped current having a waveform 81, it will be realized that the parabolic-shaped portion of the current waveform 80 resulting from integration of the sawtooth-shaped component of the applied voltage, is subtracted from or added to, in accordance with the polarity of the waveform 49, the parabolic-shaped current having a waveform 81. Thus, attempts to correct the undesired tilt of the current waveform 81, by combining the current, having a waveform 80, therewith results in undesired distortion of the parabolic shape of the waveform 81. Since it is only the pulse-shaped portion of the waveform 49 which is utilized to provide the sawtooth-shaped portion of the waveform 80 whereby tilt correction for the waveform 81 is effected, attempts to increase the range or tilt correction by increasing the potential, waveform 49, therefore relatively introduce increasingly large undesired parabolic-shaped current components.

Referring now to the embodiment of FIG. 3 as illustrated by the waveforms of FIG. 6, it has been found that the convergence capabilities of the vertical convergence circuitry may be enhanced by improving the waveform of potential which is applied to the windings 45R, 45G, and 45B of the electromagnets 37, 39, and 41. In other words, the waveform 51 of the second output potential may be altered in a desired manner by combining in out of phase relationship therewith a pre-selected amount of the pulse-shaped portion of the first output potential, waveform 49.

More specifically, the first output potential, having a waveform 49, is coupled via a potential waveform selecting means 63 to the junction 61. The selecting means 63 serves to provide a low impedance to the pulse-shaped portion and a relatively high impedance to the sawtooth-shaped portion of the first output potential, waveform 49. The potential waveform selecting means 63 is in the form of a voltage dependent impedance having the above-described impedance characteristics and a preferred form is a voltage dependent resistor.

Upon application of the first output potential, waveform 49, to the waveform selecting means 63, a pulse-shaped potential, having a waveform 83, appears at the junction 61. Thereat, the pulse-shaped potential, waveform 83, is combined with the second output potential, waveform 51, causing substantial cancellation of the pulse-shaped portions to provide a combined potential having a substantially sawtooth-shaped waveform 85. Thereafter, the combined potential, waveform 85, is applied to the vertical convergence windings 45R, 45G, and 45B to effect development of a current flow having a desired substantially parabolic-shaped waveform.

Additionally, it should perhaps be noted that the employment of a potential waveform selecting means 63 whereby the sawtooth-shaped portion of the first output potential, waveform 49, is discriminated against prevents undesired distortion of the substantially sawtooth-shaped portion of the combined potential, waveform 85. Moreover, the potential sensitivity of the selecting means 63 prevents the formation of an AC shunting path for the AC load on the cathode circuit of the vertical output tube 47.

Thus, there has been provided an electrical circuit which greatly enhances the convergence capabilities of a color television receiver. The circuit includes means for selective conduction of desired portions of potential waveforms as well as discrimination against conduction of undesired portions of potential waveforms. Also, a combined potential having a desired waveform is provided without deleterious effect upon the signal handling capabilities of the circuitry. Further, an improved convergence capability is provided without undesirably increasing the signal power capabilities of the potential source. Moreover, the improved waveform shaping effectively provides increased range of operational control adjustment for effecting convergence of the electron beams of a cathode ray tube.

While there has been shown and described what is at present considered the preferred embodiment of the invention, it will be obvious to those skilled in the art that various changes and modifications may be made therein without departing from the invention as defined by the appended claims.

What is claimed is:

1. In a color television receiver employing a multi-gun cathode ray tube providing a plurality of electron beams traversing paths along the longitudinal axis of the cathode ray tube, apparatus associated with the cathode ray tube for deflecting the electron beams in both horizontal and vertical directions, and apparatus including electromagnets each having a horizontal and a vertical winding for converging the electron beams at a common point during deflection, an electrical circuit for applying energizing potentials to the vertical winding of the electromagnets comprising in combination:

a potential source providing first and second output potentials, said potentials having a waveform occurring at vertical deflection frequency and including a substantially sawtooth-shaped portion and a substantially pulse-shaped portion;

means for applying said first output potential to said vertical winding of said electromagnets, said pulse-shaped portion of said waveform causing development of a current flow therein having a substantially sawtooth-shaped waveform;

means for coupling said pulse-shaped portion of said first output potential in phase opposition to said second output potential to cause cancellation of said pulse-shaped portion of said second output potential and provide a combined potential having a substantially sawtooth-shaped waveform, said means including means for selectively conducting said pulse-shaped portion of said first output potential; and means for applying said combined potential to said vertical winding of said electromagnets to cause development of a current flow having a substantially parabolic-shaped waveform.

2. The electrical circuit of claim 1 wherein said means for selectively conducting said pulse-shaped waveform is a voltage dependent impedance.

3. The electrical circuit of claim 2 wherein said voltage dependent impedance is in the form of a voltage dependent resistor.

4. In a color television receiver employing a multi-gun cathode ray tube providing a plurality of electron beams traversing paths along the longitudinal axis of said cathode ray tube, apparatus associated with the cathode ray tube for deflecting the electron beams in both horizontal and vertical directions, and apparatus including electromagnets each having a horizontal and a vertical winding for converging the electron beams at a common point during deflection, an electrical circuit for applying energizing potentials to the vertical winding of the eletcromagnets comprising in combination:

a source for providing first and second output potentials, said potentials having a waveform occurring at vertical deflection frequency and including a substantially sawtooth-shaped portion and a substantially pulse-shaped portion;

means for combining said second output potential and said pulse-shaped portion of said first output potential in phase opposition to effect cancellation of said pulse-shaped portion and provide a combined potential having a substantially sawtooth-shaped waveform, said means including a voltage dependent impedance coupling said first and second output potentials; and means for applying said combined potential having a substantially sawtooth-shaped waveform to the vertical convergence winding of at least one electromagnet associated with said multi-gun cathode ray tube to effect convergence of said electron beams.

5. The electrical circuit of claim 5 wherein said voltage dependent impedance is in the form of a voltage dependent resistor.

References Cited

UNITED STATES PATENTS

| | | | |
|---|---|---|---|
| 2,726,354 | 12/1955 | Stark | 315—13 |
| 2,907,915 | 10/1959 | Gleichauf | 315—13 |
| 2,928,981 | 3/1960 | Kolesnik et al. | 315—13 |
| 3,114,858 | 12/1963 | Schopp | 315—13 X |

RODNEY D. BENNETT, *Primary Examiner.*

M. F. HUBLER, *Assistant Examiner.*

UNITED STATES PATENT OFFICE
CERTIFICATE OF CORRECTION

Patent No. 3,397,340 August 13, 1968

Charles B. Neal et al.

It is certified that error appears in the above identified patent and that said Letters Patent are hereby corrected as shown below:

Column 1, line 53, "electrimagnets" should read -- electromagnets --. Column 4, line 43, "or" should read -- of --. Column 6, line 45, "claim 5" should read -- claim 4 --.

Signed and sealed this 13th day of January 1970.

(SEAL)
Attest:

Edward M. Fletcher, Jr.
Attesting Officer

WILLIAM E. SCHUYLER, JR.
Commissioner of Patents